United States Patent
MacLellan et al.

(10) Patent No.: US 6,177,861 B1
(45) Date of Patent: Jan. 23, 2001

(54) SYSTEM FOR SHORT RANGE WIRELESS DATA COMMUNICATION TO INEXPENSIVE ENDPOINTS

(75) Inventors: John Austin MacLellan, Freehold Township, Monmouth County; R. Anthony Shober, Middletown Township, Monmouth County, both of NJ (US)

(73) Assignee: Lucent Technologies, Inc, Murray Hill, NJ (US)

(*) Notice: Under 35 U.S.C. 154(b), the term of this patent shall be extended for 0 days.

(21) Appl. No.: 09/118,647

(22) Filed: Jul. 17, 1998

(51) Int. Cl.$^7$ ....................................... H04Q 5/22
(52) U.S. Cl. .................. 340/10.1; 370/229; 340/10.2; 340/10.3
(58) Field of Search .................. 340/10.1, 10.2, 340/10.3, 10.31, 10.32, 10.4, 10.41, 10.42, 825.54; 235/384; 342/42–51; 370/229, 235

(56) References Cited

U.S. PATENT DOCUMENTS 5,721,733 * 2/1998 Wang et al. ......................... 370/332
5,896,060 * 4/1999 Ovard et al. ......................... 329/304
5,929,779 * 7/1999 MacLellan et al. ............. 340/825.54

* cited by examiner

*Primary Examiner*—Michael Horabik
*Assistant Examiner*—M Shimizu
(74) *Attorney, Agent, or Firm*—John A. Caccuro (57) ABSTRACT

A system provides short range wireless data communication from a central control point (e.g., interrogator) to inexpensive endpoints (e.g., tags). The endpoints utilize the technology of modulated backscatter for transmission from the tags to the interrogator. The system uses a new downlink protocol for data transmission from the interrogator to the tags and a new uplink protocol for data transmission from the tags to the interrogator. Both protocols use a backoff/retry algorithm to randomly retransmit any non-acknowledged messages. System capacity from the tags to the interrogator is further enhanced by the use of uplink subcarrier frequency division multiplexing.

31 Claims, 8 Drawing Sheets

UPLINK DATA EXCHANGE PROTOCOL 500

*FIG. 6*

DOWNLINK DATA EXCHANGE PROTOCOL 600

FIG. 7

DOWNLINK MESSAGE STRUCTURE 700

| MESSAGE SEGMENT | BITS |
| --- | --- |
| PREAMBLE 701 | 11 |
| BARKER CODE 702 | 13 |
| INTERROGATOR ID 703 | 8 |
| $MESSAGE_1$ TAG ID 704 | 16 |
| $MESSAGE_1$ COUNTER 705 | 8 |
| $MESSAGE_1$ DATA 706 | 16 |
| $MESSAGE_n$ TAG ID 704 | 16 |
| $MESSAGE_n$ COUNTER 705 | 8 |
| $MESSAGE_n$ DATA 706 | 16 |
| CRC 707 | 24 |

THUS, DOWNLINK MESSAGE LENGTH = 56 + 40n bits

FIG. 8

UPLINK MESSAGE STRUCTURE 800

| MESSAGE SEGMENT | BITS |
| --- | --- |
| PREAMBLE 801 | 11 |
| BARKER CODE 802 | 13 |
| $TAG\ ID_1$ 803 | 16 |
| MESSAGE TYPE 804 | 4 |
| MESSAGE COUNTER 805 | 8 |
| TAG MESSAGE 806 | 96 |
| CRC 807 | 24 |

THUS, UPLINK MESSAGE LENGTH = 172 BITS

FIG. 9

ENHANCED UPLINK DATA EXCHANGE PROTOCOL 900

FIG. 10

SUBCARRIER SIGNALS 1000

FIG. 11

SUBCARRIER DEMODULATOR 212

SYSTEM FOR SHORT RANGE WIRELESS DATA COMMUNICATION TO INEXPENSIVE ENDPOINTS

RELATED APPLICATIONS

Related subject matter is disclosed in the following applications filed previously and assigned to the same Assignee hereof: U.S. patent application Ser. No. 08/571,004, MacLellan-Shober-Vannucci 2-6-19, entitled "Enhanced Uplink Modulated Backscatter System", and U.S. patent application Ser. No. 08/777,834, MacLellan-Shober-Wright 6-11-16, entitled "Subcarrier Frequency Division Multiplexing of Modulated Backscatter Signals."

GOVERNMENT CONTRACT

This invention was made with government support. The government has certain rights in this invention.

FIELD OF THE INVENTION

This invention relates to wireless communication systems and, more particularly, to a system for a wireless communication system that provides short range communications to inexpensive endpoints.

BACKGROUND OF THE INVENTION

It is desired to develop a system to support short range wireless data communication to inexpensive endpoints. Radio Frequency IDentification (RFID) systems are radio communication systems that communicate between a radio transceiver, called an Interrogator, and a number of inexpensive devices called Tags. RFID technology may be appropriate to consider in the development of such a system. In RFID systems, the Interrogator communicates to the Tags using modulated radio signals, and the Tags respond with modulated radio signals. Typically, communications from the Interrogator to the Tag utilize amplitude modulated radio signals, which are easily demodulated. For communications from the Tag to the Interrogator, Modulated BackScatter (MBS) is a commonly used technique. In MBS, the Interrogator transmits a Continuous-Wave (CW) radio signal to the Tag. The Tag then modulates the CW signal using MBS where the antenna is electrically switched, by the Tag's modulating signal, from being an absorber of RF radiation to being a reflector of RF radiation; thereby encoding data from the Tag onto the CW radio signal. The Interrogator demodulates the incoming modulated radio signal and decodes the Tag's data message. For Tag to Interrogator MBS communications, prior art maintains the use of Frequency Shift Keying (FSK) modulation and Phase Shift Keying (PSK) techniques for communications.

What is needed is a communications system that will allow short range wireless data communication to a number of inexpensive endpoints. As an example, consider the communication of sensor data within a space where a large amount of electronic equipment is present. Such a situation could occur within the control room of an industrial process, within a compartment of a naval vessel, within a manufacturing environment, within a military vehicle such as a tank, within the electronics on board an aircraft, etc. In such applications there may be as many as 1,000 sensors to be monitored. Present technology supports the use of sensors connected via wires to central communication points which can be very expensive to install. Current technology also supports the use of wireless Local Area Networks (WLANs) to interconnect the endpoints to a central communication point, however they are expensive.

Thus, there is a continuing need for an inexpensive wireless data network which will allow data communications to a large number of inexpensive devices, such as sensors.

SUMMARY OF THE INVENTION

In accordance with the present invention, a system provides short range wireless data communication from a central control point (e.g., interrogator) to inexpensive endpoints (e.g., tags). The endpoints utilize the technology of modulated backscatter for transmission from the tags to the interrogator. The system uses a new downlink protocol for data transmission from the interrogator to the tags and a new uplink protocol for data transmission from the tags to the interrogator. Both protocols use a backoff/retry algorithm to randomly retransmit any non-acknowledged messages. System capacity from the tags to the interrogator is further enhanced by the use of uplink subcarrier frequency division multiplexing.

DETAILED DESCRIPTION

In the following description, each item or block of each figure has a reference designation associated therewith, the first number of which refers to the figure in which that item is first described (e.g., 101 is first described in FIG. 1).

Figure 1:
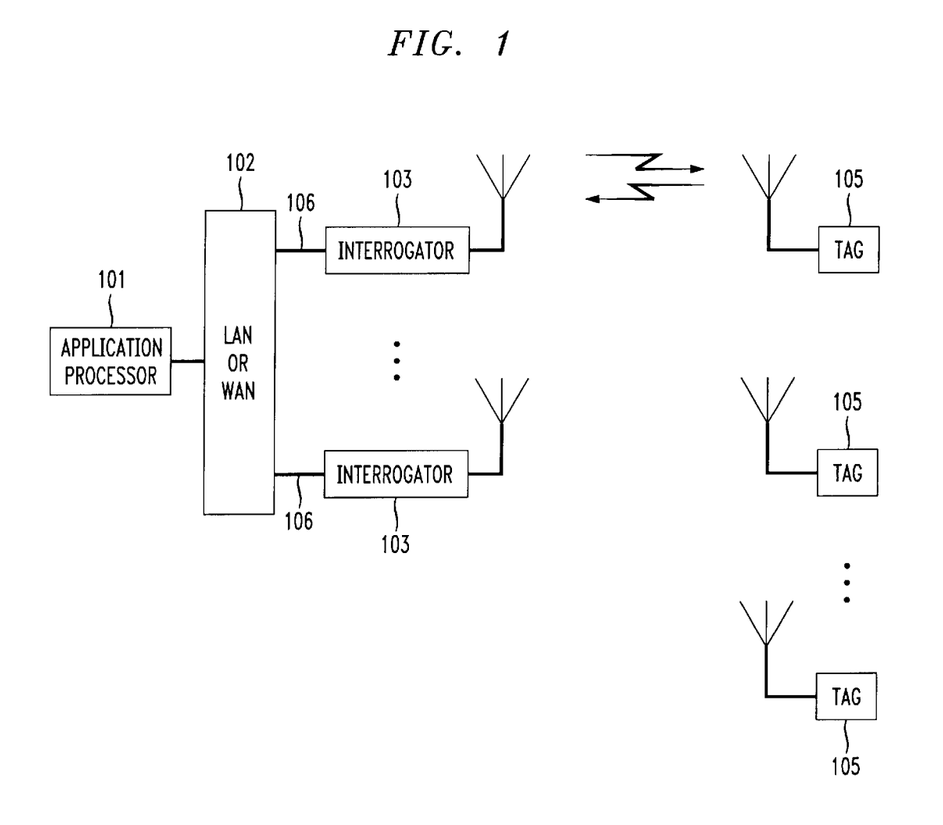
FIG. 1 shows a block diagram of an illustrative Wireless Data Communications (WDC) system.

With reference to FIG. 1, there is shown an overall block diagram of an illustrative Wireless Data Communications (WDC) system useful for describing the present invention. An Application Processor 101 communicates over a Local Area Network (LAN) or Wide Area Network (WAN) 102 to one or more Interrogators 103. Note that the Local Area Network or Wide Area Network 102 could be either wired or wireless. The Interrogator 103 then communicates with one or more inexpensive endpoints, herein called for convenience Tag 105, although the Tag 105 could be any electronic device with local intelligence.

Communications Technology Description

In one application, the Interrogator 103 receives a Data Message 106, typically from an Application Processor 101.

Figure 2:
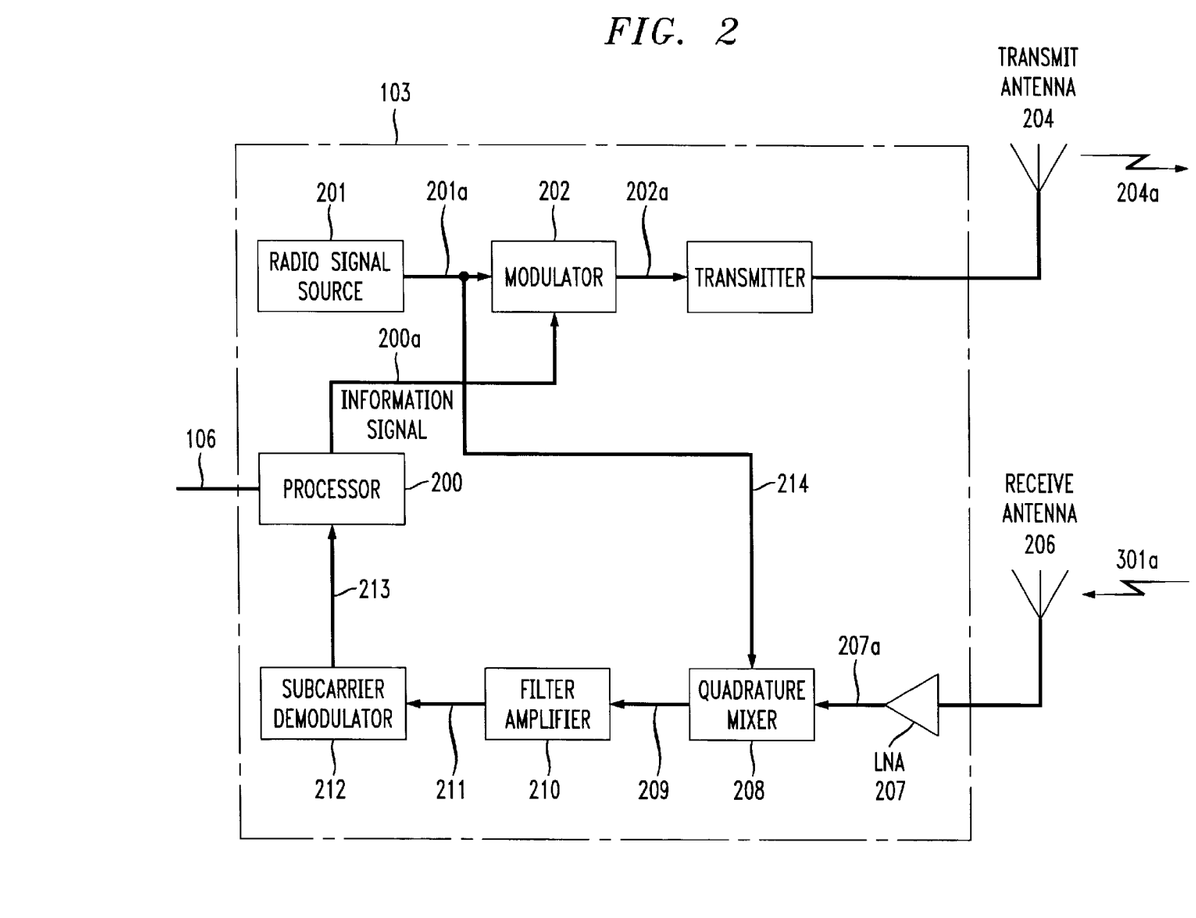
FIG. 2 shows a block diagram of an illustrative Interrogator Unit used in the WDC system of FIG. 1.

With joint reference to FIGS. 1 and 2, the Interrogator 103 takes this Data Message 106 and the Processor 200 uses the information contained within Data Message 106 and properly formats a downlink message, Information Signal 200a, to be sent to the Tag 105. Radio Signal Source 201 generates Radio Signal 201a, and the Modulator 202 modulates the Information Signal 200a onto the Radio Signal 201a to form the Modulated Signal 202a. The Transmitter 203 then transmits the Modulated Signal 202a via Transmit Antenna 204, illustratively using amplitude modulation, to a Tag 105. The reason amplitude modulation is a common choice is that the Tag can demodulate such a signal with a single, inexpensive nonlinear device (such as a diode).

Figure 3:
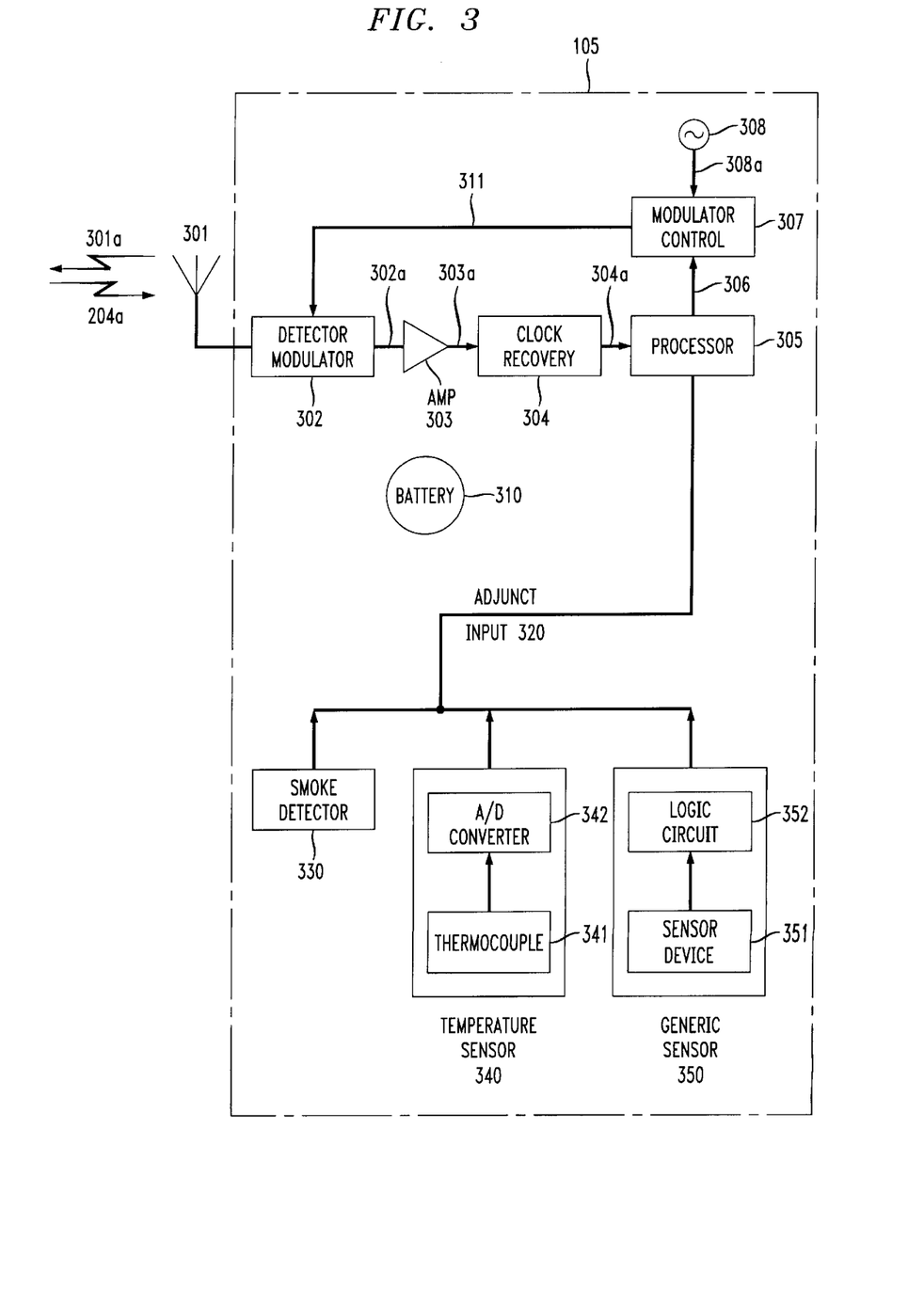
FIG. 3 shows a block diagram of a Tag Unit used in the WDC system of FIG. 1.

With reference to FIG. 3, there is shown a block diagram of a Tag 105. In the Tag 105, the Antenna 301 (frequently a loop or patch antenna) receives the modulated signal. This signal is demodulated, directly to baseband, using the Detector/Modulator 302, which, illustratively, could be a single Schottky diode. Detector/Modulator 302 demodulates the incoming signal directly to baseband. The resulting Information Signal 302a, which signal contains the same data as in 200a, is then amplified by Amplifier 303, and synchronization is recovered in Clock Recovery Circuit 304. The resulting information signal 304a is sent to a Processor 305. The Processor 305 is typically an inexpensive microprocessor, while the Clock Recovery Circuit 304 can be implemented in an ASIC (Application Specific Integrated Circuit). The ASIC could also include the Processor 305. The Processor 305 generates an uplink Information Signal 306 to be sent from the Tag 105 back to the Interrogator 103. This Information Signal 306 is sent to Modulator Control 307, which uses the Information Signal 306 to modulate a Subcarrier Frequency 308a generated by the Subcarrier Frequency Source 308. The Frequency Source 308 could be a crystal oscillator separate from the Processor 305, or it could be a frequency source derived from the Processor 305—such as the primary clock frequency of the Processor 305. The Modulated Subcarrier Signal 311 is used by Detector/Modulator 302 to modulate the Radio Carrier Signal 204a received by Tag 105 to produce a modulated backscatter (e.g., reflected) signal. This is illustratively accomplished by switching on and off the Schottky diode using the Modulated Subcarrier Signal 311, thereby changing the reflectance of Antenna 301. A Battery or other power supply 310 provides power to the circuitry of Tag 105.

The Information Signal 306 can be generated in a number of ways. For example, the Processor 305, in the Tag 105, could use an Adjunct Input signal 320 as the source for the Information Signal 306. Examples of information sources which could utilize the Adjunct Input signal 320 include a Smoke Detector 330, a Temperature Sensor 340, or a Generic Sensor 350. In some cases, the amount of data transmitted by the Adjunct Input signal 320 is small; in the case of a Smoke Detector 330, a single bit of information (has the smoke detector sounded or not) is transmitted. In the case of a Temperature Sensor 340, a Thermocouple 341 could illustratively be connected to an A/D Converter 342 to generate the Adjunct Input 320 signal. In the case of a Generic Sensor 350, the Sensor Device 351 interfaces with Logic Circuit 352 to generate the Adjunct Input 320 signal. In this case, the Logic Circuit 352 could be very simple or relatively complex depending on the complexity of the Generic Sensor 350. One example of a Generic Sensor 350 is a biometric sensor which records biometric information (heart rate, respiration, etc.) of a human being. Such information could then be routinely transmitted to the Application Processor 101 to continually monitor a status of a person or other living organism.

Overall Protocol Structure

Figure 4:
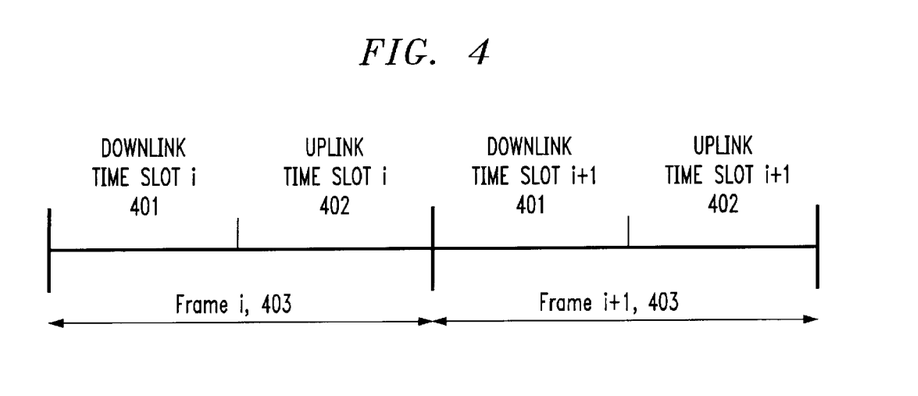
FIG. 4 shows a time slotted structure used in the protocol for the WDC system of FIG. 1.

The technology discussed above is the lowest cost RF wireless data communications technology known in the art today. To design a wireless data communications system that can support the requirement of communicating with a large number of endpoints, a time slotted structure as shown in FIG. 4 is used. The Downlink Time Slot i 401 is a time slot in which information is transmitted from the Interrogator 103 to the Tag 105. The Uplink Time Slot i 402 is a time slot in which information is transmitted from the Tag 105 to the Interrogator 103 using MBS such as described above. In FIG. 4, these time slots are shown to be of equal length of time; this condition is not a necessary requirement of our invention. The Downlink 401 and Uplink 402 Time Slots could be of unequal time duration. Further, in FIG. 4, the time slots are shown as one Downlink Time Slot i 401 followed by one Uplink Time Slot i 402; this condition is also not necessary for this description. The protocol could support the use of a plurality of Downlink Time Slots 401 followed by one Uplink Time Slot 402, or it could support one Downlink Time Slot 401 followed by a plurality of Uplink Time Slots 402, or it could support a plurality of Downlink Time Slots (401) followed by another plurality of Uplink Time Slots (402). The decision as to the exact number of Downlink 401 and Uplink 402 Time Slots to be used is left to the individual application designer, as some applications have greater data communications requirements in the Downlink direction, and some applications have greater data communications requirements in the Uplink direction. For the rest of this discussion, we assume that a single Downlink Time Slot i 401 is followed by a single Uplink Time Slot i 402, but this assumption does not restrict the generality of the methods disclosed here. We refer to Frame i 403 as the current frame, where in this context Frame i 403 refers to the combination of Downlink Time Slot i 401 followed by Uplink Time Slot i 402 as shown in FIG. 4.

We first describe a Data Exchange, or transfer of data, from the Tag 105 to the Interrogator 103. The amount of data that can be transmitted in a single Uplink Time Slot i 402 is discussed below. If the amount of data the Tag 105 desires to transmit to the Interrogator 103 exceeds the maximum amount of data possible in a single Uplink Time Slot 402, then Tag 105 packetizes this data and transmit one packet within each Uplink Time Slot i 402 until all the data is transmitted. The protocol discussion below concentrates on the methods of transmitting and acknowledging a single such packet.

We have described above Interrogator/Tag communications as utilizing Amplitude Modulation in the downlink and MBS in the uplink. In a bidirectional radio communications system, it is not uncommon for one of the communications paths to be more challenging—that is, for one path to operate on the average with a lower signal to noise ratio than the other path. In applications utilizing MBS technology, it is not uncommon for the downlink communications to be more reliable than the uplink communications. The reason is that since the uplink communications utilize a reflected radio signal, the uplink RF path loss is two times the one way path loss from the Interrogator 103 to the Tag 105. Given this fact, elements of the protocols discussed above reflect the consideration that uplink messages may need to be repeated multiple times in order to be successfully received. However, this consideration does not limit the general applicability of the protocol outlined here.

Uplink Data Exchange

Figure 5:
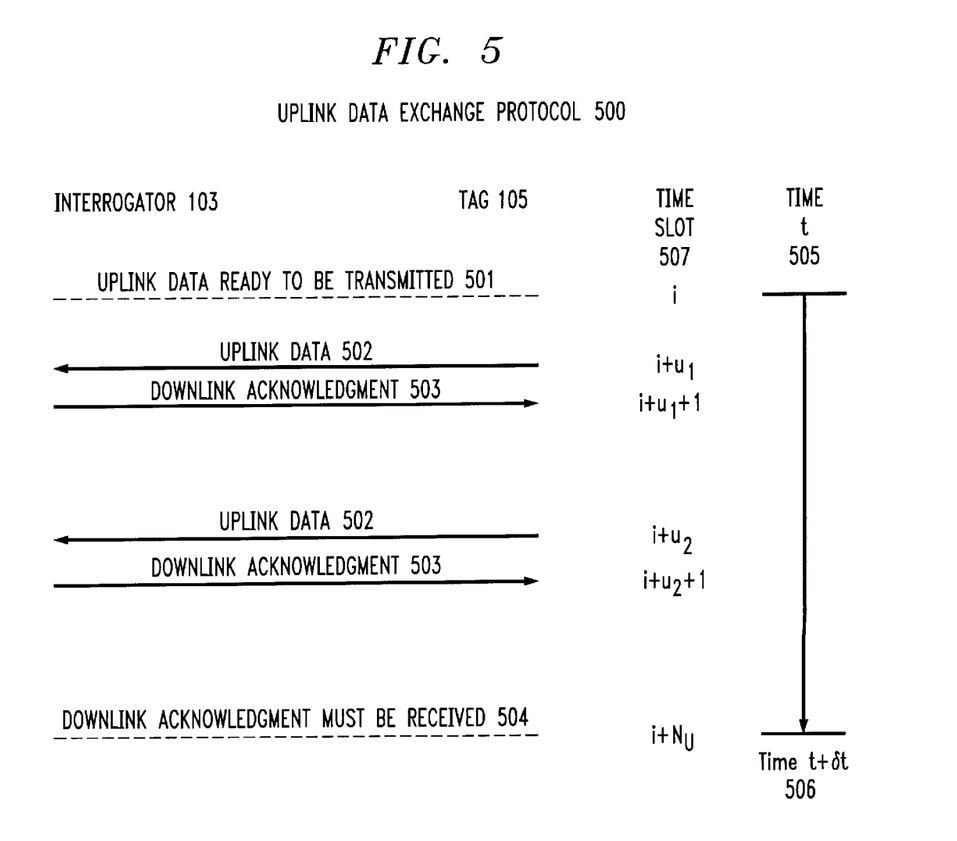
FIG. 5 shows the Uplink Data Exchange Protocol used in the WDC of FIG. 1.

Above we have described the physical layer of the radio communications system. We now discuss the protocol used to communicate information using this physical layer. FIG. 5 outlines the Uplink Data Exchange Protocol 500. In the Uplink Data Exchange Protocol 500, data is present in the Tag 105 which is required to be transmitted to the Interrogator 103. Successful reception of this data transmission is desired to be acknowledged by the Interrogator 103 in an acknowledgment message received by Tag 105.

FIG. 5 is a time line showing the transmission of particular messages as a function of time. In the Uplink Data Exchange Protocol 500, Uplink Data Ready to be Transmitted 501 is the time that the Tag 105 has recognized the presence of data (the Information Signal 200a) that it wishes to transmit to the Interrogator 103, and also has performed any required packetization of the data as mentioned above. The time at Uplink Data Ready 501 is Time t, 505, with the Time Slot (or Frame) index 507 being i. At this time, the Tag 105 selects a number $N_U$. $N_U$ is the number of Frames i, 403, within which this packet of uplink data, containing all or part of the Information Signal 200a, must be successfully received by the Interrogator 103. The value of $N_U$ is determined by the response time needs of the particular application, and is further discussed below.

After Uplink Data Ready 501, the Tag 105 calculates a set of ordered random numbers $u_j$, j=1, . . . , J; where $u_j$ is randomly distributed within the set (1, $N_U$), where the values $u_j$ do not repeat, and where the values $u_j$ are ordered such that $u_{j+1} > u_j$, for j contained within (1, J-1). Then, at Time Slot $i+u_j$, the Interrogator 103 schedules the transmission of J Uplink Data 502 messages; these messages being the Uplink Transmission 301a. Let us assume that the Processor 200 of Interrogator 103 is capable of decoding the Uplink Data 502 message in the guard time (see below) between the time said message is received and the beginning of the subsequent Time Slot $i+u_j+1$. If the Uplink Data 502 message is successfully received (where successful reception maybe determined by the use of a CRC error detecting code, discussed below), then this message is acknowledged by the Interrogator 103 transmitting a Downlink Acknowledgment 503 to the Tag 105 at Time Slot $i+u_j+1$. Note that if the Processor 200 cannot decode the Uplink Data 502 message that rapidly, then the Downlink Acknowledgment 503 is delayed until Time Slot $i+u_j+2$; this does not change the basic concept.

Thus, the Tag 103 knows to expect a Downlink Acknowledgment 503 in Time Slot $i+u_j+1$ (where j is 2 in our example). If such a Downlink Acknowledgment 503 is received correctly, then the Uplink Data Exchange Protocol 500 is successfully completed, and the remaining Uplink Data 502 messages, scheduled for later Time Slots $i+u_j$ (where j is 2), need not be transmitted. If the Downlink Acknowledgment 503 is not successfully received, then the Tag 105 transmits the Uplink Data 502 again at Time Slot $i+u_j$ (where j is 2), the next value of j, and the Tag 105 listens for the subsequent Downlink Acknowledgment 503 to be successfully received in time slot $i+u_j+1$ (where j is 2); and if successfully received, then the Uplink Data Exchange Protocol 500 is successfully completed. The Uplink Data Exchange Protocol 500 is considered to be unsuccessful if no Downlink Acknowledgment 503 is received for any of the J Uplink Data 502 messages that have been transmitted.

We now discuss the selection of the parameters discussed above. Based upon the requirements of the application, we determine a length of time δt for which the Uplink Data Exchange Protocol 500 must be completed. Thus, we note that $N_U$ is found by dividing δt by the length of time required for Frame i 403. The selection of δt is now discussed. For a critical on-line monitoring system, the data may be needed rapidly by the Interrogator 103 or else it will be unnecessary by virtue of being untimely; thus δt may be small. For an application with a "batch processing" operating mode, the value of δt could be quite large since the data is desired to be delivered but the timeliness of the data is not highly critical. We then select the value of J such that at least several opportunities for the protocol exchange shown in FIG. 5 can be repeated. For example, J might be set to be equal to 5; this provides 5 opportunities for the protocol exchange shown in FIG. 5 to be repeated.

Radio Communications Range and Interference

Let us assume that a set of Interrogators 103 are present in a certain environment, such as shown in FIG. 1. The reason for the presence of multiple Interrogators 103 is to assure complete radio coverage; that is, that successful communications can take place with all Tags 105 within that environment. Depending on the propagation characteristics of the environment, it may be that downlink messages from more than one Interrogator 103 may be successfully received by a Tag 105; it may also be that an uplink message from a specific Tag 105 may be successfully received by multiple Interrogators 103. In the Uplink Data Exchange Protocol 500 above, the Downlink Acknowledgment 503 was transmitted and addressed to a specific Tag 105. It is reasonable for only the Interrogators 103 that were in some sense "nearby" to the specific Tag 105 to transmit that specific Downlink Acknowledgment 503.

We limit the number of Interrogators 103 that transmit a specific Downlink Acknowledgment 503 to those Interrogators 103 that are within radio communications range of the Tag 105. By limiting such transmissions, the total system capacity is increased. For our purposes here, we assume that Interrogators 103 within radio communications range of a specific Tag 105 are all transmitting the same Downlink Acknowledgment 503. We must further assure that those transmissions do not mutually interfere. For example, the Downlink Acknowledgment 503 is transmitted as discussed above using Amplitude Modulation (AM). If the transmissions of multiple Interrogators 103 within radio communications range of a specific Tag 105 overlap, the AM modulated signals will destructively interfere. Therefore, we assume that the Interrogators 103 are time-synchronized with each other to avoid such interference.

Downlink Data Exchange

Figure 6:
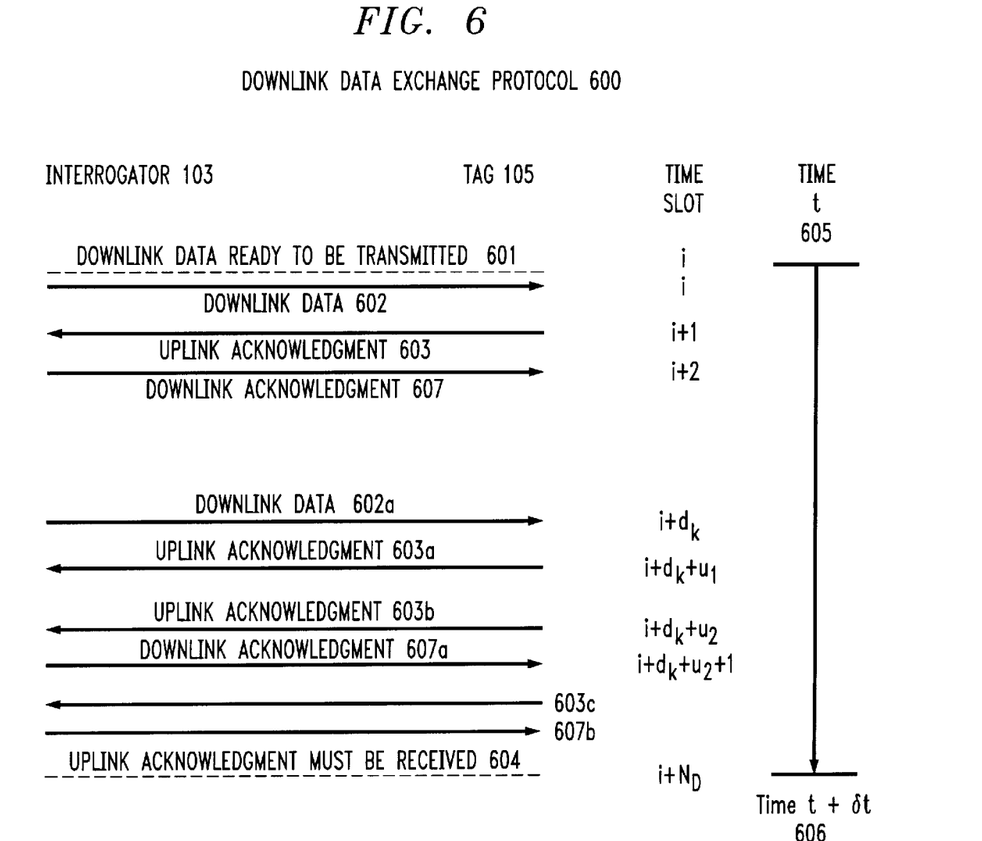
FIG. 6 shows the Downlink Data Exchange Protocol used in the WDC of FIG. 1.

We now consider the case in which data is to be transmitted from the Interrogator 103 to the Tag 105. FIG. 6 outlines the Downlink Data Exchange Protocol 600. In this case, the Interrogator 103 packetizes the data (if required), then transmits a packet of data in Downlink Time Slot i, 401, as Downlink Data 602. As above, we assume that the downlink transmissions for all Interrogators 103 that are within radio range of each other are time synchronized to avoid mutual interference. Referring to FIG. 6, the Downlink Data Ready to be Transmitted 601 occurs at Time Slot i. The Interrogator 103 now desires to transmit Downlink Data 602 as soon as possible. If we assume that Downlink Time Slot i is available, the Interrogator 103 transmits the Downlink Data 602 at Time Slot i. The Tag 105 receives the Downlink Data 602; we assume that it requires the length of time of one Frame i 403 for the Tag 105 to decode the Downlink Data 602 to determine if the message was successfully received (this is based upon the assumption that the Processor 305 in the Tag 105 is not as powerful as the Processor 200 in the Interrogator 103). Thus, the Uplink Acknowledgment 603 is transmitted by the Tag 105 to the Interrogator 103 in Time Slot i+1. The Interrogator 103, expecting to receive the Uplink Acknowledgment 603 in Time Slot i+1, determines if the Uplink Acknowledgment 603 is successfully received. If the Uplink Acknowledgment 603 is successfully received, then the Interrogator 103 transmits a Downlink Acknowledgment 607 to the Tag 105. The purpose of this final Downlink Acknowledgment 607 is to inform the Tag 105 that it need not transmit any additional Uplink Acknowledgment 603 messages. The above protocol functions properly in the event that all three messages; the Downlink Data 602, the Uplink Acknowledgment 603, and the Downlink Acknowledgment 607, are successfully received. However, in real radio channels, some message failures are to be expected. Therefore, both the Interrogator 103 and the Tag 105 utilize multiple retry algorithms.

When Downlink Data Ready to be Transmitted 601 is present, the Interrogator 103 schedules the transmissions of multiple Downlink Data 602 messages. To accomplish this, the Interrogator 103 calculates a set of K ordered random numbers $d_k$, for k=1, . . . , K; where $d_k$ is randomly distributed within the set $(1,N_D)$, where the values $d_k$ do not repeat, and where the values $d_k$ are ordered such that $d_{k+1} > d_k$, for k contained within (1,K-1). The parameter $N_D$ is selected in an analogous manner to that of the parameter $N_U$ above. Thus, the Interrogator schedules the transmissions of Downlink Data 602 messages at Time Slot $i+d_k$, for k=1, . . . , K. Note that in the discussion above, we have assumed that $d_1$ is 1; that is, that the first Downlink Data 602 message is transmitted in the first available Downlink Time Slot i 401. Whether $d_1$ is taken as 1 is optional in the protocol. Therefore, we have now scheduled a set of K Downlink Data 602 messages.

For the Downlink Data Exchange Protocol 600, the selection of $N_D$ and K is similar to the selection of $N_U$ and J in the Uplink Data Exchange Protocol 500 discussed above. The main idea is for a series of K transmissions of the Downlink Data 602 message to be scheduled, and for $N_U$ to be selected from considerations of the timeliness of the data required by this particular application. For each transmission of the Downlink Data 602 message, the Tag 105 then schedules the transmission of M Uplink Acknowledgment 603 messages. These Uplink Acknowledgment 603 messages are generally scheduled to be transmitted between Time Slot $i+d_k$ and Time Slot $i+d_{k+1}$; that is, the time $N_{UD}$ between two subsequent Downlink Data 602 messages. Therefore, $N_{UD}$ is chosen to be less than $N_D$. It may be reasonable for $N_{UD}$ to be chosen as $N_D/K$, however this is but one example of how to choose $N_{UD}$. Thus, if we divide $N_D$ into K sets of Frames 403, then the number of Frames 403 in each of these K sets is $N_D/K$. The parameter M is also variable; its selection depends on the expected uplink traffic demand.

Referring to FIG. 6, the Downlink Data 602a message is transmitted at Time Slot $i+d_k$. If the Tag 105 does not successfully receive the Downlink Data 602a message, then the Tag 105 waits for the next Downlink Data transmission. Let us assume that the Tag 105 does successfully receive this Downlink Data 602 message. The Tag 105 then schedules the transmission of M Uplink Acknowledgment 603 messages. This is accomplished by having the Tag 105 calculate a set of ordered random numbers $u_m$, m=1, . . . , M; where $u_m$ is randomly distributed within the set $(1,N_{UD})$ where the values $u_m$ do not repeat, and where the values $u_m$ are ordered such that $u_{m+1} > u_m$ for m contained within (1,M-1). The Tag 105 uses these values of $u_m$ to determine in which Time Slot $i+d_k+u_m$ the Uplink Acknowledgment 603 is transmitted. Two of the of the M Uplink Acknowledgment messages, 603a and 603b, are shown at Time Slots $i+d_k+u_1$ and $i+d_k+u_2$ in FIG. 6.

Let us assume that the Interrogator 103 successfully receives the transmission of the Uplink Acknowledgment 603b at Time Slot $i+d_k+u_2$. Then, the Interrogator 103 transmits a single Downlink Acknowledgment 607a at Time Slot $i+d_k+u_2+1$. If the Downlink Acknowledgment 607a is received successfully by the Tag 105, then the Tag 105 cancels the scheduled transmission of the remaining Uplink Acknowledgment messages, e.g., 603c. If the Downlink Acknowledgment 607a message is not successfully received, then the Interrogator 103, upon the next successful reception of the Uplink Acknowledgment 603c, re-transmits another Downlink Acknowledgment 607b. This overall process continues until each of the Downlink Data 602, the Uplink Acknowledgment 603, and the Downlink Acknowledgment 607 messages are successfully received.

Message Structures

We now illustrate possible structures for downlink as well as uplink transmissions. Here we disclose structures such that the same downlink structure can be used for both the Downlink Acknowledgment 503 and the Downlink Data 602; and also that the same uplink structure can be used for the Uplink Data 502 and the Uplink Acknowledgment 603.

Figure 7:
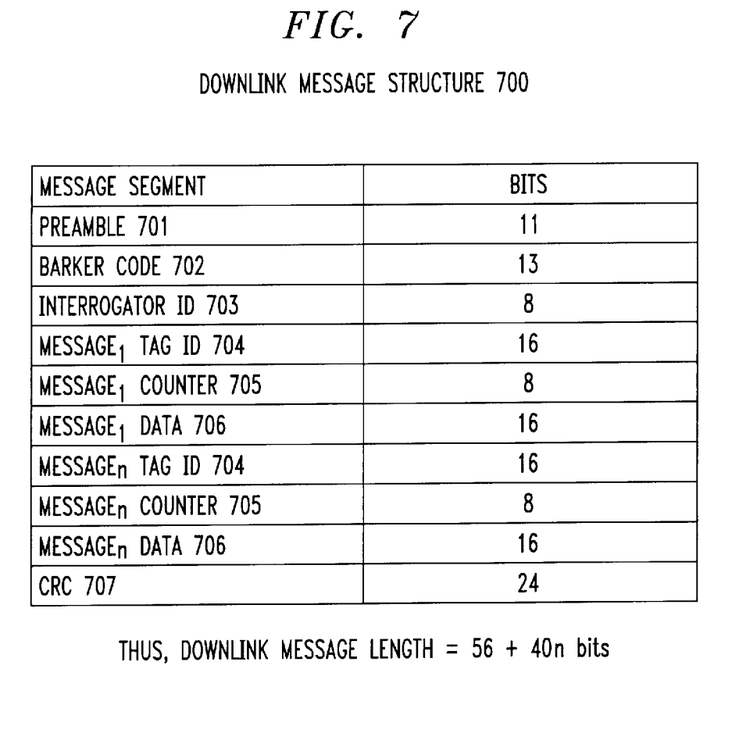
FIG. 7 shows the Downlink Message Structure used in the protocol for the WDC of FIG. 1.
Figure 8:
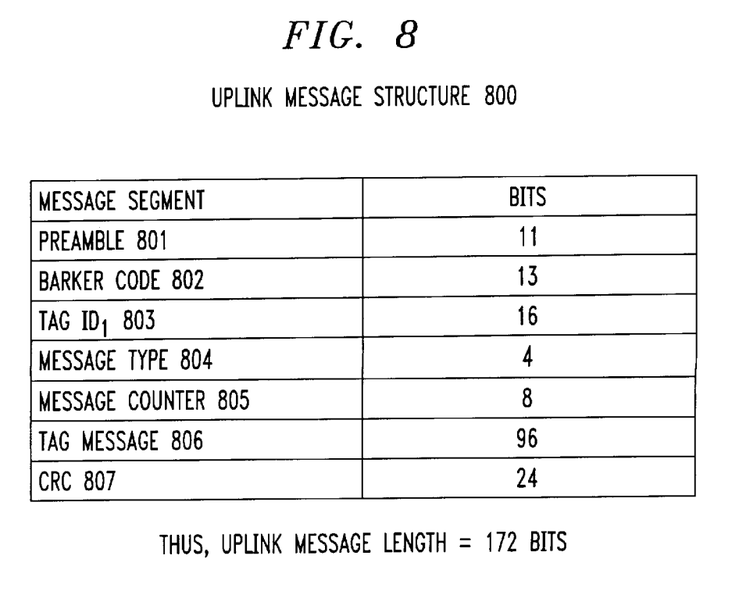
FIG. 8 shows the Uplink Message Structure used in the protocol of FIG. 6.

FIG. 7 shows an illustrative Downlink Message Structure 700 which presents the message segments and number of bits associated with the downlink message. The message begins with a Preamble 701 which allows the Clock Recovery 304 of the Tag 105 to become synchronized. Then, a Barker Code 702 defines the beginning of the actual data of the message. The Interrogator ID 703 defines which Interrogator is transmitting this signal. Note that for all Interrogators 103 that are in radio range of each other, the data in the Interrogator ID 703 segment is identical if all of the Interrogators 103 were simultaneously transmitting; otherwise the data being transmitted in that message segment would destructively interfere. Then, messages to different Tags are shown; the message to tag 1 is shown in the three fields $Message_1$ Tag ID 704, $Message_1$ Counter 705, and $Message_1$ Data 706. The $Message_1$ Tag ID 704 is the identification number of the Tag 105 to which Message 1 is addressed. The $Message_1$ Counter 705 is a message counter, used so that an acknowledgment can be made to a specific data message. The $Message_1$ Data 706 is the actual data; this field could be larger depending on the characteristics of the application. The same three fields, 704, 705, and 706, are then repeated for each different message to be transmitted, up to n different messages in a downlink message. The CRC 707 is a 24 bit error correcting code CRC, used to allow the Tag 105 to determine if the downlink message has been correctly received. We note that the number of bits used in the message structures of FIGS. 7 and 8 represent only one possible implementation. For example, for a system with greater than 64,000 Tags 105, then more than 16 bits is required for the $Message_1$ Tag ID 704, etc. The size of the $Message_1$ Data 706 was designed for very small downlink messages, such as simple acknowledgments; other applications may require the transmission of more data in the downlink direction.

FIG. 8 shows an illustrative Uplink Message Structure 800. The Preamble 801 and Barker 802 serve the same purposes as in the Downlink Message Structure 700. The Tag ID 803 is the ID of the Tag 105 transmitting this message. The Message Type 804 distinguishes this message as being either a data message or an acknowledgment. The Message Counter 805 is analogous to the Message Counter 705 above, and allows an acknowledgment to be made to a specific message. The Tag Message 806 is the actual data; in this case, 12 bytes. The CRC 807 allows the Interrogator 103 to determine if this message has been correctly received.

It is noted, using the above Downlink Message Structure 700 and Uplink Message Structure 800, the data signals (such as the Uplink Data 502 and the Uplink Acknowledgment 603, and similarly for the Downlink Data 602 and the Downlink Acknowledgment 503) can be implemented using exactly the same message structure. This is beneficial since it allows the same demodulation and message parsing hardware, firmware, or software to apply to any type of message.

It is also helpful if the timing of the Downlink Message Structure 700 and Uplink Message Structure 800 are such that some guard time is introduced. Guard time is generally an amount of time in between the scheduled ending of one message and the beginning of another message. This time is introduced in order to compensate for inaccuracies in timing and synchronization, clock accuracy, etc.

Interleaved Data Exchange

The Message Counter 705 and Message Counter 805 are used in the following way. For example, in an Uplink Data Exchange 500, the Tag 105 transmits an Uplink Data 502 message. In that message, the Message Counter 805 contains an 8 bit value. When the Interrogator 103 transmits the Downlink Acknowledgment 503 to acknowledge the Uplink Data 502, the Message$_1$ Counter 705 contains the same 8 bit value, thus allowing a specific Uplink Data 502 message to be acknowledged. This process is applied in an analogous manner for a Downlink Data Exchange 600.

Figure 9:
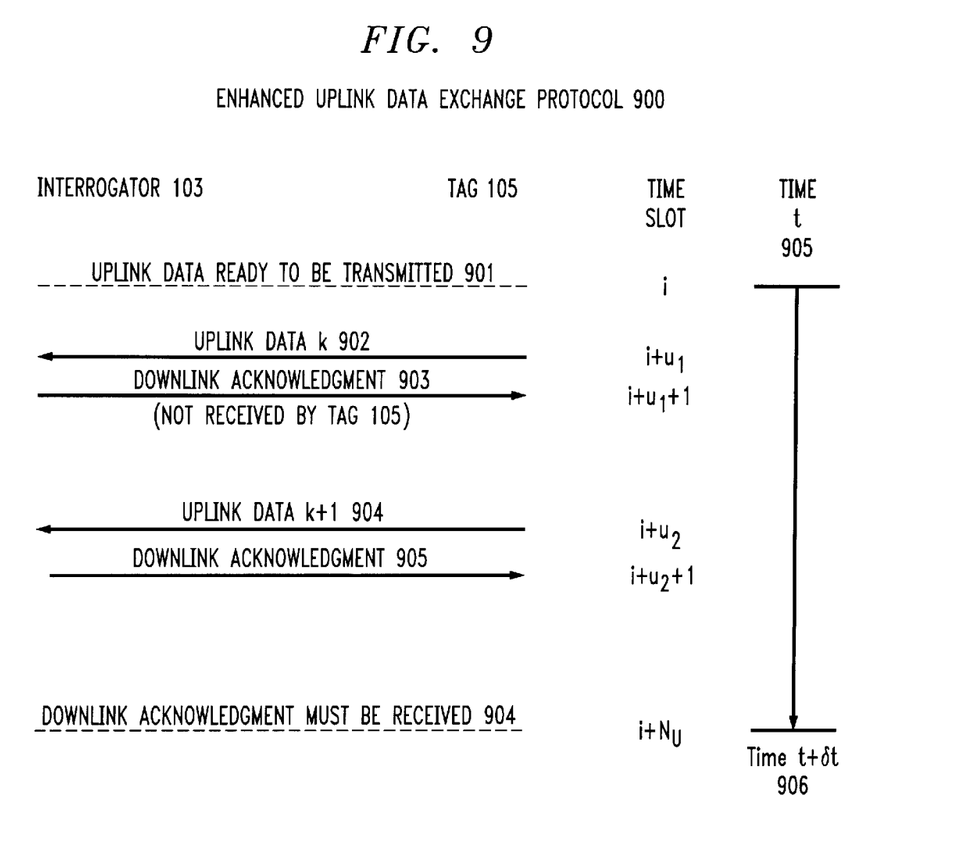
FIG. 9 shows an Enhanced Uplink Data Exchange Protocol of FIG. 5.

Given this capability, it is possible to enhance the Uplink Data Exchange 500, as shown in FIG. 9. In this example, the Tag 105 has more than one packet of data to transmit to the Interrogator 103; refer to these packets as Uplink Data k 902 and Uplink Data k+1 904. Note that from FIGS. 5 and 7, the Downlink Message Structure 700 has the capability for multiple acknowledgments in the same Downlink Acknowledgment 503. First, the Tag 105 transmits Uplink Data k 902 to the Interrogator 103 in Time Slot i+u$_1$. The Tag 105 expects to receive the Downlink Acknowledgment 903 in Time Slot i+u$_1$+1; however assume in this case that this acknowledgment is not successfully received. (The unsuccessful reception of the Downlink Acknowledgment 903 could be due to the Interrogator 103 not successfully receiving the Uplink Data k 902, or it could be due to the Tag 105 not successfully receiving the Downlink Acknowledgment 903. In either event, the result is that the Tag 105 does not successfully receive the Downlink Acknowledgment 903.) In this event, the Tag 105 could next choose to transmit the Uplink Data k+1 904. Then, assume that the Tag 105 receives a Downlink Acknowledgment 905. As shown in FIG. 7, this Downlink Acknowledgment 905 could acknowledge either the Uplink Data k 902 or the Uplink Acknowledgment k+1 904 or both. This method of interleaving the data transmission and acknowledgments can allow more rapid transmission and acknowledgments of messages in the event that multiple packets must be transmitted.

A similar procedure could be used for the Downlink Data Exchange 600, given that the Uplink Message Structure 800 is enhanced to support the acknowledgment of multiple Downlink Data 602 messages within one Uplink Acknowledgment 603.

Frequency Multiplexing-Increasing Uplink Capacity

For some applications, such as a sensor network in which more data is being transmitted from the Tag 105 to the Interrogator 103 than is transmitted from the Interrogator 103 to the Tag 105, it is advantageous to increase the uplink capacity. One method to improve such capacity is to increase the data rate of the Uplink Data 502 signal; however this technique increases the receiver bandwidth and this harms the signal to noise radio, potentially decreasing system capacity and range. Another technique is to increase the system capacity without decreasing the system range is through the use of frequency multiplexing. In FIG. 3, the Frequency Source 308 generates the Subcarrier Signal 308a. In frequency multiplexing, the Frequency Source 308 has the capability of generating any of a set of possible subcarrier frequencies. For this protocol, assume that for each uplink message, such as an Uplink Data 502 or an Uplink Acknowledgment 603, that a particular subcarrier frequency is chosen at random by the Frequency Source 308 from the set of possible subcarrier frequencies. Then, the protocol proceeds in the same manner as described above.

Figure 10:
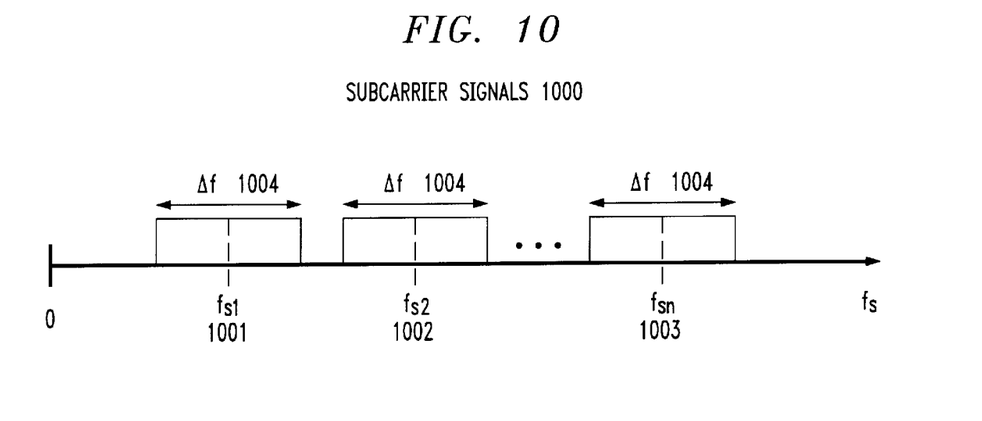
FIG. 10 shows the Subcarrier Signals shown in FIG. 3.
Figure 11:
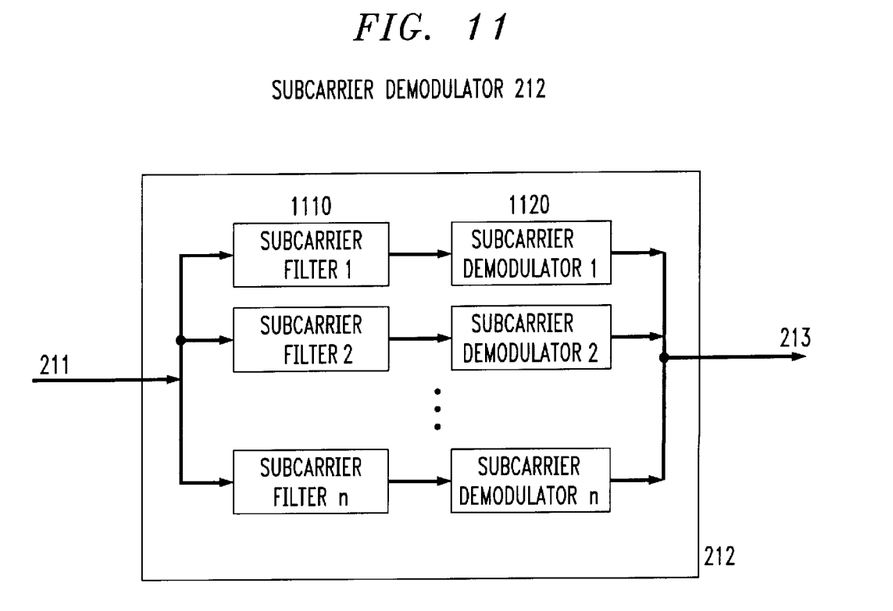
FIG. 11 shows more details of the Subcarrier Demodulator of FIG. 3.

FIG. 10 shows the frequency space of the Subcarrier Signals 1000. The Tag 105 selects a Subcarrier Signal 308a, here called $f_{si}$ for i contained within (1,n), from a set of n possible frequencies. Then, up to n different Tags 105 can transmit an uplink signal (either an Uplink Data 502 or an Uplink Acknowledgment 603) during the same Uplink Time Slot i 402. The Interrogator 103 receives the signal 301a, containing the n uplink signals, with the Receive Antenna 206. The LNA 207 amplifies the received signal at RF frequencies. The Quadrature Mixer 208 demodulates the received signal 301a, using homodyne detection, directly to baseband. The output of the Quadrature Mixer 208 are the I (in-phase) and Q (quadrature) components of the demodulated signal, shown in FIG. 2 as signal 209. FIG. 10 shows the makeup of signal 209 for either the I or the Q channel. The bandwidth of each signal is $\Delta f$ 1004; thus, the first subcarrier signal extends from $(f_{s1}-\Delta f/2)$ to $(f_{s1}+\Delta f/2)$, the second subcarrier signal extends from $(f_{s2}-\Delta f/2)$ to $(f_{s2}+\Delta f/2)$, etc. Note then that all of the information signals are contained within the range $(f_{s1}-\Delta f/2)$ to $(f_{sn}+\Delta f/2)$. Then, the Filter Amplifier 210 is used to filter out signals outside of this range. The Subcarrier Demodulator 212 is then capable of simultaneously demodulating n uplink information signals which are modulated onto n Subcarrier Signals 308a. Within Subcarrier Demodulator 212, two basic functions are present; to further filter the signal, and then to demodulate the information signal 306 from the Subcarrier Signal 308a. In one embodiment, these two functions are performed digitally; and could be implemented in a Digital Signal Processor (DSP) or in a Field Programmable Gate Array (FPGA). The digital filters for each of the Subcarrier Signals 308a are tuned for that Subcarrier Signal 308a; for example, for Subcarrier signal 308a number 1, the filter passes frequencies between $(f_{s1}-\Delta f/2)$ to $(f_{s1}+\Delta f/2)$. The Subcarrier Demodulator 212 is shown in more detail in FIG. 11. The input signal 211 contains both the I and Q channels as discussed above. The Subcarrier Filter 1110 provides filtering specific to Subcarrier Signal 308a ($f_{s1}$ 1001); that is, it passes frequencies between $(f_{s1}-\Delta f/2)$ to $(f_{s1}+\Delta f/2)$. The output of the Subcarrier Filter 1 (1110) is passed to the Subcarrier Demodulator 1 (1120). The Subcarrier Demodulator 1 (1020) demodulates the Information Signal 306 from the Subcarrier Signal 308a. The output signal 213 includes the Information Signals 306 from all of the Tags 105 transmitting uplink signals at this time on different Subcarrier Signals 308a.

The result of this technique is as follows. Consider the case of an Uplink Data Exchange 500. In that case, a random number $u_1$ in the range $(1,N_U)$ is chosen, leading thus to $N_U$ different Uplink Time Slots i 402 from which to choose. If we add the additional flexibility of n Subcarrier Signals 308a, then the number of different choices increases to $n \times N_U$, thus leading to potentially dramatic increases in uplink capacity.

What has been described is merely illustrative of the application of the principles of the present invention. Other arrangements and methods can be implemented by those skilled in the art without departing from the spirit and scope of the present invention.

What is claimed is:

1. A radio communication system comprising
    at least one interrogator including
        means to transmit a downlink information modulated radio signal;
    at least one tag including
        means to receive said downlink modulated radio signal,
        means to demodulate said downlink modulated radio signal to recover said downlink information signal, and
        means to transmit an uplink radio signal using modulated backscatter;
    said at least one interrogator further including
        means to receive said uplink information signal; and
    said radio communication system further comprising
        random transmission means at said at least one interrogator and/or at said at least one tag for enabling the transmit means thereat to repeat, one or more times, the transmission of said downlink modulated radio signal and/or said uplink radio signal, respectively, in response to a predetermined condition, each repeat transmission being scheduled at a different random time, each random time being determined irrespective of the absence of a valid received acknowledgment signal.

2. The radio communication system of claim 1 wherein the random transmission means is located at said at least one interrogator and repeats the transmission of said downlink modulated radio signal at a random time in response to a predetermined condition thereat.

3. The radio communication system of claim 1 wherein the random transmission means is located at said at least one tag and repeats the transmission of said uplink radio signal at a random time in response to a predetermined condition thereat.

4. The radio communication system of claim 2 wherein the predetermined condition is the absence of said uplink radio signal received in response to said downlink modulated radio signal.

5. The radio communication system of claim 2 wherein the predetermined condition is an unsuccessful reception of said uplink radio signal received in response to said downlink modulated radio signal.

6. The radio communication system of claim 2 wherein said at least one interrogator further includes
    means to transmit an downlink acknowledge signal in response to a received uplink radio signal.

7. The radio communication system of claim 2 wherein said uplink radio signal is one of a group of signals including an uplink acknowledge signal and an uplink information modulated radio signal.

8. The radio communication system of claim 2 wherein said at least one tag further includes,
    said random transmission means to repeat the transmission of said uplink radio signal at a random time in response to a predetermined condition thereat.

9. The radio communication system of claim 3 wherein the predetermined condition is the absence of said downlink modulated radio signal received in response to said uplink radio signal.

10. The radio communication system of claim 3 wherein the predetermined condition is an unsuccessful reception of said downlink modulated radio signal received in response to said uplink modulated radio signal.

11. The radio communication system of claim 3 wherein said at least one tag further includes
    means to transmit an uplink acknowledge signal in response to a received downlink modulated radio signal.

12. The radio communication system of claim 3 wherein said uplink radio signal is one of a group of signals including an uplink acknowledge signal and an uplink information modulated radio signal.

13. The radio communication system of claim 3 wherein said at least one interrogator further includes,
    said random transmission means to repeat the transmission of said downlink modulated radio signal at a random time in response to a predetermined condition thereat.

14. The radio communication system of claim 1 wherein said at least one tag further includes means to generate a subcarrier frequency randomly selected from one of a set of possible subcarrier frequencies,
    means to modulate said uplink information signal onto said subcarrier frequency to form a modulated subcarrier signal,
    means to transmit said modulated subcarrier signal using modulated backscatter;
    said at least one interrogator further including
    means to receive said modulated subcarrier signal,
    means to demodulate said uplink information signal from said modulated subcarrier signal.

15. The radio communication system of claim 14 wherein said at least one interrogator further includes means to demodulate more than one of said uplink information signals received during the same time period.

16. The radio communication system of claim 1 wherein said at least one tag further includes
    means to transmit more than one of said uplink information signal before said reception of said downlink information signal.

17. The radio communication system of claim 1 wherein said at least one interrogator further includes
    means to transmit more than one of said downlink information signal before reception of said uplink information signal.

18. An interrogator for use in a radio communication system, said interrogator comprising
    means to transmit a downlink information signal modulated radio signal; and
    means to repeat the transmission of said transmitted downlink radio signal, one or more times, in response to a predetermined condition, each repeat transmission occurring at a different random time, each random time being determined irrespective of the absence of a valid received acknowledgment signal.

19. The interrogator of claim 18 wherein the predetermined condition is the absence of a signal received in response to said transmitted downlink radio signal.

20. The interrogator of claim 18 further comprising
    means to receive multiple subcarrier signals from a plurality of tags.

21. The interrogator of claim 18 further comprising
    means to transmit more than one of said downlink information signal before reception of an uplink information signal.

22. The interrogator of claim 18 further comprising means to receive a modulated backscatter signal, where said modulated backscatter signal contains an uplink information signal modulated upon a subcarrier signal, where said subcarrier signal is randomly chosen from a set of possible subcarrier signals, and where said modulated backscatter signal is received at a random time.

23. A tag for use in a radio communication system comprising means to generate a subcarrier signal from a set of possible subcarrier signals, means to modulate an uplink information signal onto said subcarrier signal to generate a modulated subcarrier signal, and means to transmit said modulated subcarrier signal using modulated backscatter one or more times, each transmssion being sent at a different random time, each random time being determined irrespective of the absence of a valid received acknowledgment signal.

24. The tag of claim 23 where said subcarrier signal is randomly selected from a set of possible subcarrier signals.

25. The tag of claim 23 including condition measuring circuitry to measure one or more predetermined conditions selected from a group including temperature, smoke and biometric information.

26. The radio communication system of claim 23 wherein said at least one tag further includes means to measure temperature, means to include said temperature measurement within said uplink information signal.

27. The radio communication system of claim 23 wherein said at least one tag further includes means to detect the presence of smoke, means to include the results of said smoke detection means within said uplink information signal.

28. The radio communication system of claim 23 wherein said at least one tag further includes means to measure biometric information, means to include said biometric information measurement within said uplink information signal.

29. A method of operating a radio communication system comprising at least one interrogator and including at least one tag, the method comprising the steps of:

at an interrogator,
transmitting a downlink information modulated radio signal to at least one tag,
at one tag,
receiving said downlink modulated radio signal and demodulating said downlink modulated radio signal to recover said downlink information signal,
transmitting an uplink information signal using modulated backscatter;
at said interrogator,
receiving said uplink information signal; and
the method further comprising the step of
repeating at said at least one interrogator and/or at said at least one tag the transmission of said downlink modulated radio signal and/or said uplink radio signal, respectively, one or more times, in response to a predetermined condition, each repeat transmission occurring at a random time, each random time being determined irrespective of the absence of a valid received acknowledgment signal.

30. A method of operating an interrogator for use in a radio communication system, the method comprising the steps of:

transmitting a downlink information modulated radio signal; and repeating the transmission of said transmitted downlink radio signal, one or more times, in response to a predetermined condition, each repeat transmission occurring at a random time, each random time being determined irrespective of the absence of a valid received acknowledgment signal.

31. A method of operating a tag for use in a radio communication system, the method comprising the steps of:

generating a subcarrier signal from a set of possible subcarrier signals, modulating an uplink information signal onto said subcarrier signal to generate a modulated subcarrier signal, and transmitting said modulated subcarrier signal using modulated backscatter, one or more times, each transmission occurring at a random time, the random time being determined irrespective of the absence of a valid received acknowledgment signal.

* * * * *